US011456845B2

(12) United States Patent
Kim et al.

(10) Patent No.: US 11,456,845 B2
(45) Date of Patent: Sep. 27, 2022

(54) METHOD AND DEVICE FOR SIGNAL TRANSMISSION OR RECEPTION ON BASIS OF LTE AND NR IN WIRELESS COMMUNICATION SYSTEM

(71) Applicant: LG Electronics Inc., Seoul (KR)

(72) Inventors: Youngtae Kim, Seoul (KR); Yunjung Yi, Seoul (KR); Hyunho Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 56 days.

(21) Appl. No.: 16/652,313

(22) PCT Filed: Oct. 2, 2018

(86) PCT No.: PCT/KR2018/011685
§ 371 (c)(1),
(2) Date: Mar. 30, 2020

(87) PCT Pub. No.: WO2019/070098
PCT Pub. Date: Apr. 11, 2019

(65) Prior Publication Data
US 2020/0235903 A1 Jul. 23, 2020

Related U.S. Application Data

(60) Provisional application No. 62/619,134, filed on Jan. 19, 2018, provisional application No. 62/592,336, (Continued)

(51) Int. Cl.
H04W 76/15 (2018.01)
H04W 72/04 (2009.01)
(Continued)

(52) U.S. Cl.
CPC .............. H04L 5/14 (2013.01); H04L 1/1812 (2013.01); H04W 72/0446 (2013.01); H04W 76/15 (2018.02)

(58) Field of Classification Search
CPC .... H04L 5/14; H04L 1/1812; H04W 72/0446; H04W 76/15; H04W 16/02; H04W 72/1268; H04W 72/1215
See application file for complete search history.

(56) References Cited

U.S. PATENT DOCUMENTS 9,402,268 B2 * 7/2016 Taori ................. H04W 52/0235
2016/0135143 A1 * 5/2016 Won ....................... H04W 12/08
370/312
(Continued)

OTHER PUBLICATIONS

3rd Generation Partnership Project; Ericcson; "On NR-LTE co-existence," R1-1714461, 3GPP TSG RAN WG1, Prague, Czech Republic, dated Aug. 2017, 5 pages.
(Continued)

Primary Examiner — Gregory B Sefcheck
Assistant Examiner — Joshua Smith
(74) Attorney, Agent, or Firm — Fish & Richardson P.C.

(57) ABSTRACT

The present invention relates to a method for signal transmission or reception by a terminal dual-connected to a first radio access technology (RAT) or a second RAT in a wireless communication system. Specifically, the method comprises: a step of receiving a first RAT-based downlink reference time domain duplex (TDD) uplink-downlink configuration; and a time division multiplexing (TDM) step of, when an uplink subframe on the basis of the downlink reference TDD uplink-downlink configuration is associated with a first transmission time unit having a predetermined length, setting the first transmission time unit for the first RAT and setting a second transmission time unit for the second RAT. The second transmission time unit is obtained
(Continued)

TDM in short TTI

LTE UL

NR UL by excluding a transmission time unit from the uplink subframe. The terminal is capable of communicating with at least one of another UE, a UE related to an autonomous driving vehicle, a base station or a network.

4 Claims, 15 Drawing Sheets

Related U.S. Application Data filed on Nov. 29, 2017, provisional application No. 62/588,223, filed on Nov. 17, 2017, provisional application No. 62/566,566, filed on Oct. 2, 2017.

(51) Int. Cl.
*H04L 5/14* (2006.01)
*H04L 1/18* (2006.01)

(56) References Cited

U.S. PATENT DOCUMENTS

| | | | |
|---|---|---|---|
| 2016/0192391 A1* | 6/2016 | Larsson | H04L 5/14 370/280 |
| 2016/0242168 A1* | 8/2016 | Noh | H04L 1/1854 |
| 2018/0049203 A1* | 2/2018 | Xue | H04W 72/042 |
| 2018/0054800 A1* | 2/2018 | Yeo | H04W 72/08 |
| 2019/0089502 A1* | 3/2019 | Yi | H04L 5/0041 |
| 2019/0289586 A1* | 9/2019 | Ouchi | H04L 1/1854 |
| 2021/0153279 A1* | 5/2021 | Takeda | H04W 76/16 |

OTHER PUBLICATIONS

3rd Generation Partnership Project; Huawei, HiSilicon; "Discussion on the remaining issues of LTE-NR DC and UL coexistenee," R1-1715429, 3GPP TSG RAN WG1, Nagoya, Japan, dated Sep. 2017, 13 pages.
3rd Generation Partnership Project; LG Electronics; "Discussion on dual connectivity with single active UL at a given time," R1-1713202, 3GPP TSG RAN WG1, Prague, Czech Republic, dated Aug. 2017, 4 pages.
3rd Generation Partnership Project; LG Electronics; "Simultaneous transmission and reception between LTE and NR," R1-1713220, 3GPP TSG RAN WG1, Prague, Czech Republic, dated Aug. 2017, 5 pages.
3rd Generation Partnership Project; Nokia, Nokia Shanghai Bell; "Support for semi-persistent scheduling in NB-IoT," R1-1713791, 3GPP TSG RAN WG1, Prague, Czech Republic, dated Aug. 2017, 3 pages.
International Search Report in International Appln. No. PCT/KR2018/011685, dated Jan. 10, 2019, 25 pages (with English translation).
EP Extended European Search Report in European Appln. No. 18865129.3, dated May 31, 2021, 10 pages.
Intel Corporation, "Support of single UL TX," R2-1710608, 3GPP TSG-RAN WG2 #99bis, Prague, Czech Republic, dated Oct. 9-13, 2017, 3 pages.

* cited by examiner (a) Control-plane protocol stack (b) User-plane protocol stack TDM in subframe

LTE UL

NR UL

TDM in short TTI

LTE UL

NR UL

METHOD AND DEVICE FOR SIGNAL TRANSMISSION OR RECEPTION ON BASIS OF LTE AND NR IN WIRELESS COMMUNICATION SYSTEM

CROSS-REFERENCE TO RELATED APPLICATIONS

This application is a National Stage application under 35 U.S.C. § 371 of International Application No. PCT/KR2018/011685, filed on Oct. 2, 2018, which claims the benefit of U.S. Provisional Application No. 62/619,134, filed on Jan. 19, 2018, U.S. Provisional Application No. 62/592,336, filed on Nov. 29, 2017, U.S. Provisional Application No. 62/588,223, filed on Nov. 17, 2017, and U.S. Provisional Application No. 62/566,566, filed on Oct. 2, 2017. The disclosures of the prior applications are incorporated by reference in their entirety.

TECHNICAL FIELD

The present disclosure relates to a wireless communication system and, more particularly, to a method of transmitting and receiving signals based on long-term evolution (LTE) and new radio access technology (NR) in a wireless communication system and an apparatus therefor.

BACKGROUND ART

Wireless access systems have been widely deployed to provide various types of communication services such as voice or data. In general, a wireless access system is a multiple access system that supports communication of multiple users by sharing available system resources (bandwidth, transmission power, etc.) thereamong. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As more communication devices have demanded higher communication capacity, there has been necessity of enhanced mobile broadband communication relative to legacy radio access technology (RAT). In addition, massive machine type communication (MTC) for providing various services at anytime and anywhere by connecting a plurality of devices and things to each other becomes one issue to be considered in next-generation communication. Moreover, design of a communication system considering services/UEs sensitive to reliability and latency has been discussed.

As new RAT considering such enhanced mobile broadband communication, massive MTC, ultra-reliable and low latency communication (URLLC), and the like, a new RAT system has been proposed. In the present disclosure, the corresponding technology is referred to as new RAT or new radio (NR) for convenience of description.

DISCLOSURE

Technical Problem

Hereinafter, a method of transmitting and receiving signals based on LTE and NR in a wireless communication system and an apparatus therefor will be proposed based on the above-described discussion.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solution

In one aspect of the present disclosure, a method for transmitting and receiving a signal by a terminal dual-connected to a first Radio Access Technology (RAT) and a second RAT in a wireless communication system may include receiving a downlink reference Time Domain Duplex (TDD) uplink-downlink configuration based on the first RAT, and based on that an uplink subframe based on the downlink reference TDD uplink-downlink configuration is related to a first transmission time unit having a predetermined length, performing time division multiplexing (TDM) of configuring the first transmission time unit for the first RAT and configuring a second transmission time except the first transmission time unit for the second RAT in the uplink subframe.

Further, relative positions of uplink signals having the first transmission time unit may be configured through higher layer signaling, the uplink signals being related to a downlink signal having the first transmission time unit.

Further, the first RAT may be a Frequency Domain Duplex (FDD) based Long Term Evolution (LTE) band, and the second RAT may be New Radio Access Technology (NR), wherein, based on the first time unit being mapped a short-delta short transmission time interval (Δshort-TTI) number later after a downlink subframe based on the downlink reference TDD uplink-downlink configuration, the uplink subframe may be determined based on Hybrid Automatic Repeat Request (HARQ) timing for carrier aggregation of LTE-based TDD Pcell and FDD Scell.

Further, the first RAT may be a Frequency Domain Duplex (FDD) based Long Term Evolution (LTE) band, and the second RAT may be New Radio Access Technology (NR). The method may further include, based on that the first transmission time unit present in the uplink subframe is only one, determining the uplink subframe based on Hybrid Automatic Repeat Request (HARQ) timing for carrier aggregation of LTE-based TDD Pcell and FDD Scell and transmitting an uplink signal in the first transmission time unit in the uplink subframe.

Further, the first RAT may be a Frequency Domain Duplex (FDD) based Long Term Evolution (LTE) band, and the second RAT may be New Radio Access Technology (NR). The method may further include, based on that the first transmission time unit present in the uplink subframe is only one, determining the uplink subframe based on Hybrid Automatic Repeat Request (HARQ) timing for carrier aggregation of LTE-based TDD Pcell and FDD Scell and transmitting an uplink signal in the first transmission time unit in the uplink subframe. Further, the first transmission time unit of the uplink subframe may be configured through one of higher layer signaling, a Media Access Control Control Element (MAC CE), or a control channel.

Further, information about the TDM between the first RAT and the second RAT may be exchanged through backhaul signaling between a first base station for the first RAT and a second base station for the second RAT.

Further, Hybrid Automatic Repeat Request (HARQ) timing related to the first transmission time unit may be determined according to a preset value of K (where K is a natural number).

Further, the predetermined time unit may be shorter than one subframe.

In another aspect of the present disclosure, a terminal for transmitting and receiving a signal while being dual-connected to a first Radio Access Technology (RAT) and a second RAT in a wireless communication system may include a radio frequency unit and a processor, wherein the processor may be configured to receive a downlink reference Time Domain Duplex (TDD) uplink-downlink configuration based on the first RAT and to, based on that an uplink subframe based on the downlink reference TDD uplink-downlink configuration is related to a first transmission time unit having a predetermined length, configure the first transmission time unit for the first RAT and configure a second transmission time for the second RAT in the uplink subframe except the first transmission time unit.

Advantageous Effects

According to embodiments of the present disclosure, LTE and NR based signals may be efficiently transmitted and received in a wireless communication system.

Effects obtainable from the present disclosure are non-limited by the above mentioned effect. And, other unmentioned effects can be clearly understood from the following description by those having ordinary skill in the technical field to which the present disclosure pertains.

DESCRIPTION OF DRAWINGS

The accompanying drawings, which are included to provide a further understanding of the disclosure and are incorporated in and constitute a part of this specification, illustrate embodiments of the disclosure and together with the description serve to explain the principles of the disclosure.

BEST MODE

A 3rd generation partnership project long term evolution (3GPP LTE) (hereinafter, referred to as 'LTE') communication system which is an example of a wireless communication system to which the present disclosure can be applied will be described in brief.

Figure 1:
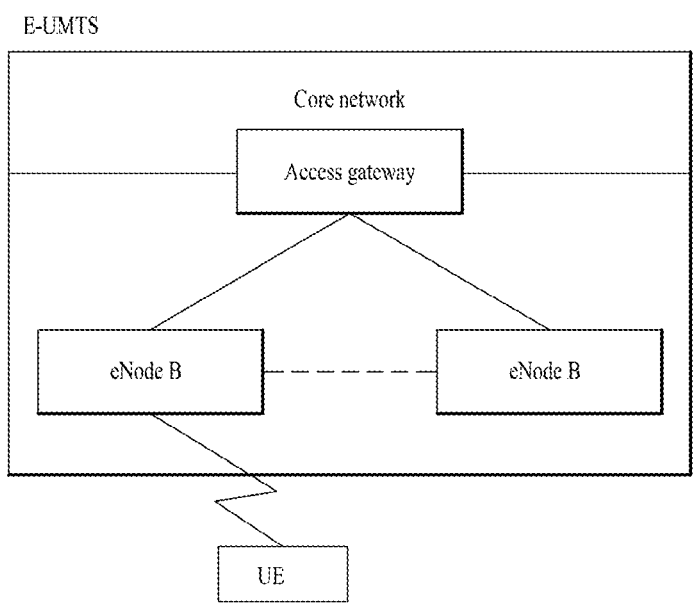
FIG. 1 schematically illustrates an E-UMTS network structure as an example of a wireless communication system.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (BSs) (or eNode B or eNB), and an Access Gateway (AG) which is located at an end of a network (E-UTRAN) and connected to an external network. The BSs may simultaneously transmit multiple data streams for a broadcast service, a multicast service and/or a unicast service.

One or more cells exist for one BS. One cell is set to one of bandwidths of 1.44, 3, 5, 10, 15 and 20 MHz to provide a downlink or uplink transport service to several UEs. Different cells may be set to provide different bandwidths. Also, one BS controls data transmission and reception for a plurality of UEs. The BS transmits downlink (DL) scheduling information of downlink data to the corresponding UE to notify the corresponding UE of time and frequency domains to which data will be transmitted and information related to encoding, data size, and hybrid automatic repeat and request (HARQ). Also, the BS transmits uplink (UL) scheduling information of uplink data to the corresponding UE to notify the corresponding UE of time and frequency domains that can be used by the corresponding UE, and information related to encoding, data size, and HARQ. An interface for transmitting user traffic or control traffic may be used between the BSs. A Core Network (CN) may include the AG and a network node or the like for user registration of the UE. The AG manages mobility of the UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the UE, etc. are required.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present disclosure are not limited to the 3GPP LTE/LTE-A. Also, specific terminologies hereinafter used in the embodiments of the present disclosure are provided to assist understanding of the present disclosure, and various modifications may be made in the specific terminologies within the range that they do not depart from technical spirits of the present disclosure.

Figure 2:
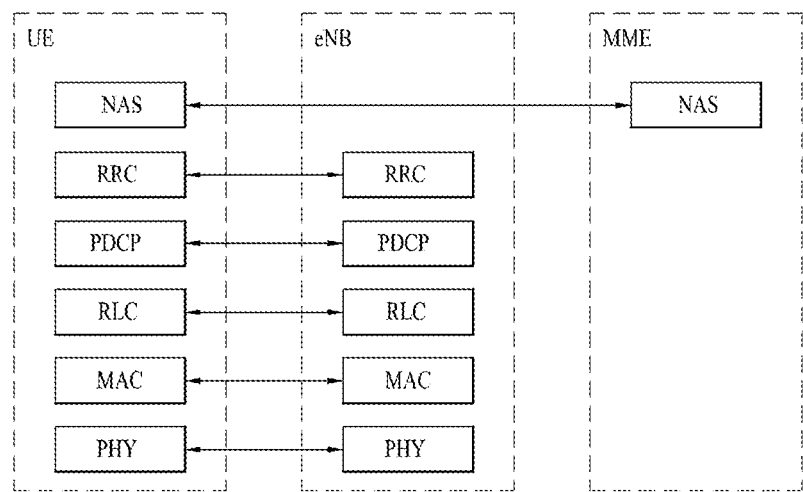
FIG. 2 illustrates control plane and user plane structures of a radio interface protocol between a UE and an E-UTRAN on the basis of the 3GPP wireless access network standard.
Figure 2:
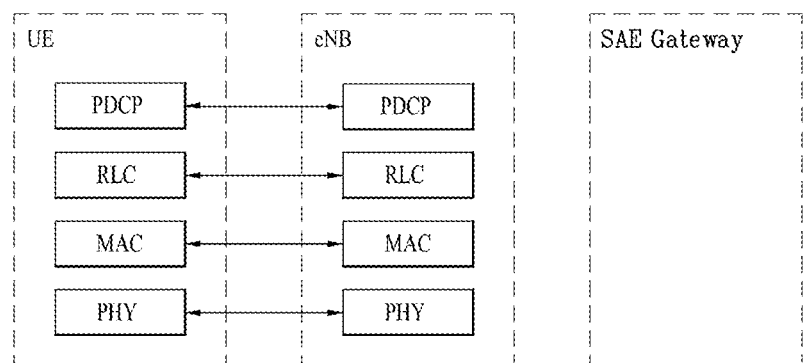

FIG. 2 is a diagram illustrating structures of a control plane and a user plane of a radio interface protocol between a UE and E-UTRAN based on the 3GPP radio access network standard. The control plane means a passageway where control messages are transmitted, wherein the control messages are used by the UE and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the UE and the network. To this end, the RRC layers of the UE and the network exchange RRC message with each other. If the RRC layer of the UE is RRC connected with the RRC layer of the network, the UE is in an RRC connected mode. If not so, the UE is in an RRC idle mode. A non-access stratum (NAS) layer located above the RRC layer performs functions such as session management and mobility management.

One cell constituting a BS (or eNB) is set to one of bandwidths of 1.4, 3.5, 5, 10, 15, and 20 MHz and provides a downlink or uplink transmission service to several UEs. At this time, different cells may be set to provide different bandwidths.

As downlink transport channels carrying data from the network to the UE, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the UE to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
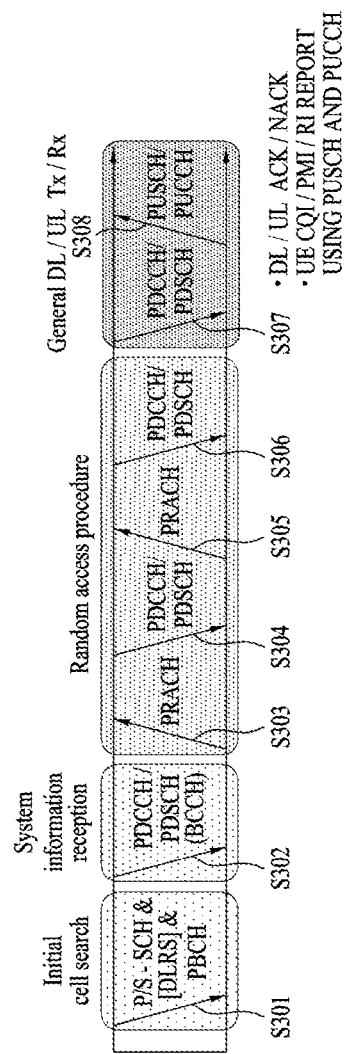
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The UE performs initial cell search such as synchronizing with the BS when it newly enters a cell or the power is turned on at step S301. To this end, the UE synchronizes with the BS by receiving a primary synchronization channel (P-SCH) and a secondary synchronization channel (S-SCH) from the BS, and acquires information such as cell ID, etc. Afterwards, the UE may acquire broadcast information within the cell by receiving a physical broadcast channel (PBCH) from the BS. Meanwhile, the UE may identify a downlink channel status by receiving a downlink reference signal (DL RS) at the initial cell search step.

The UE which has finished the initial cell search may acquire more detailed system information by receiving a physical downlink shared channel (PDSCH) in accordance with a physical downlink control channel (PDCCH) and information carried in the PDCCH at step S302.

Afterwards, the UE may perform a random access procedure (RACH) such as steps S303 to S306 to complete access to the BS. To this end, the UE may transmit a preamble through a physical random access channel (PRACH) (S303), and may receive a response message to the preamble through the PDCCH and the PDSCH corresponding to the PDCCH (S304). In case of a contention based RACH, the UE may perform a contention resolution procedure such as transmission (S305) of additional physical random access channel and reception (S306) of the physical downlink control channel and the physical downlink shared channel corresponding to the physical downlink control channel.

The UE which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the UE to the BS will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the UE may non-periodically transmit the UCI through the PUSCH in accordance with request/command of the network.

Figure 4:
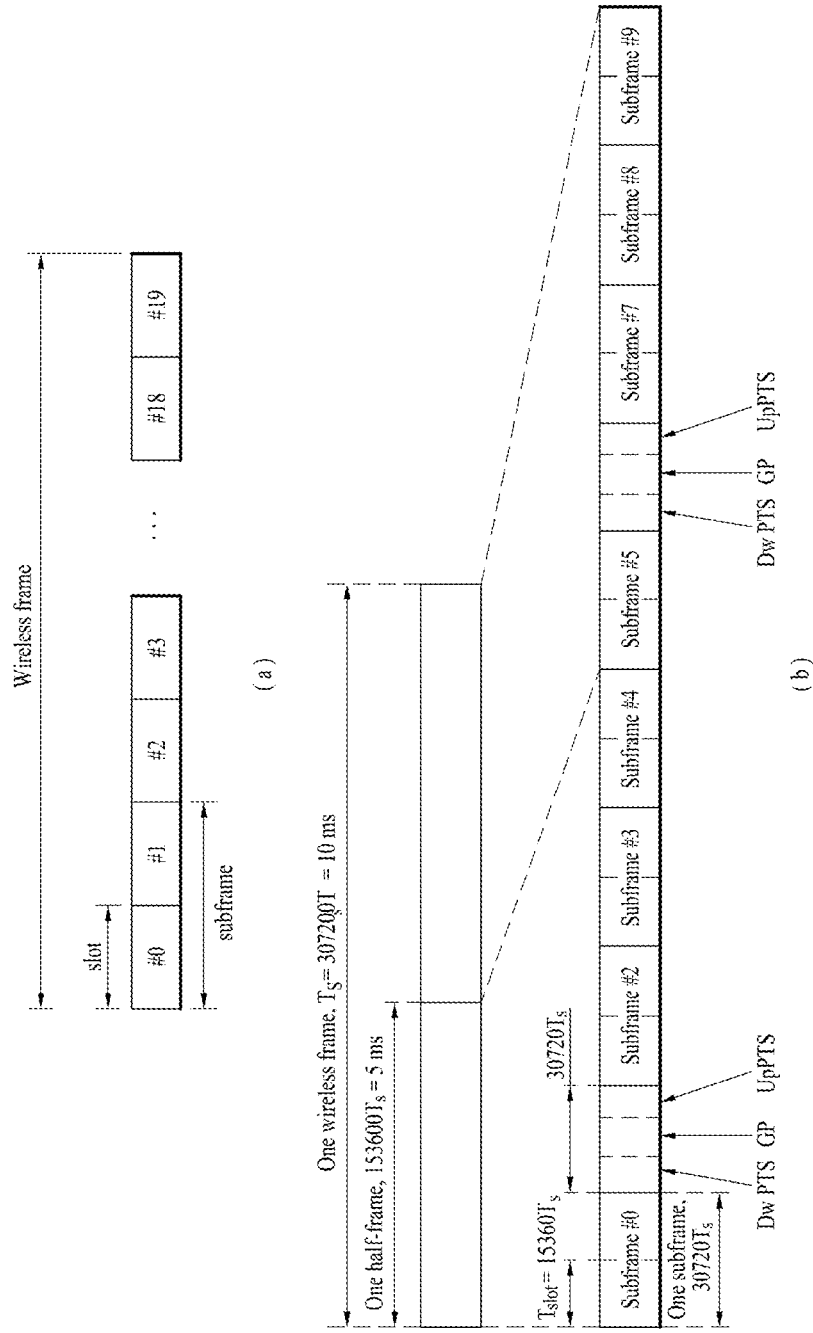
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the UE moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the UE. The UpPTS is used for channel estimation at the BS and uplink transmission synchronization of the UE. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe config- uration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
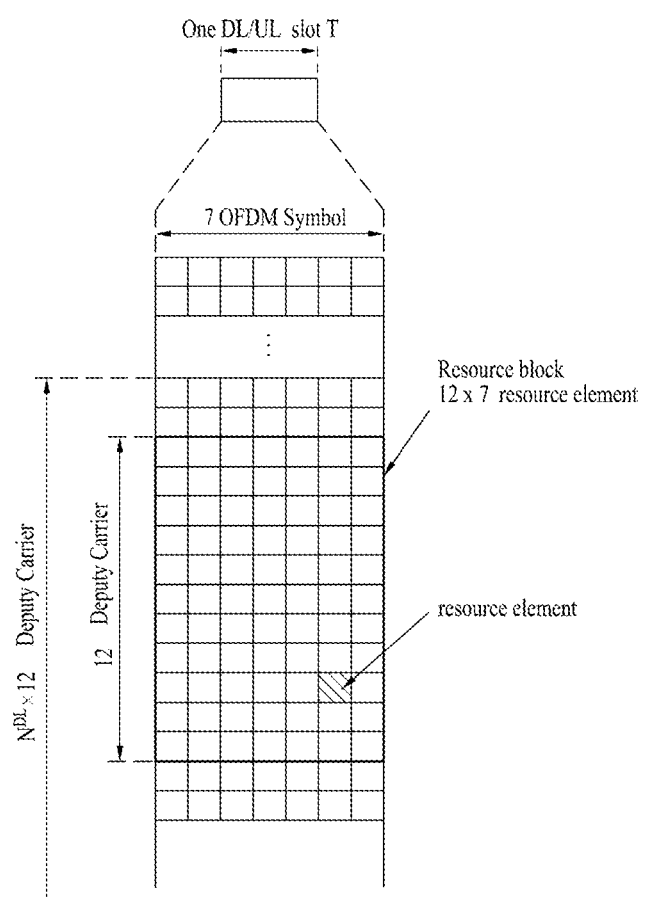
FIG. 5 illustrates a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{sc}^{RB}$ subcarriers, the DL slot includes $N_{RB}^{DL} \times N_{sc}^{RB}$ subcarriers in the frequency domain. Although FIG. 5 shows an example in which the DL slot includes 7 OFDM symbols and the resource block includes 12 subcarriers, the present disclosure is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{sc}^{RB}$ resource elements. The number ($N_{RB}^{DL}$) of resource blocks included in the DL slot depends on a DL transmission bandwidth configured in a cell.

Figure 6:
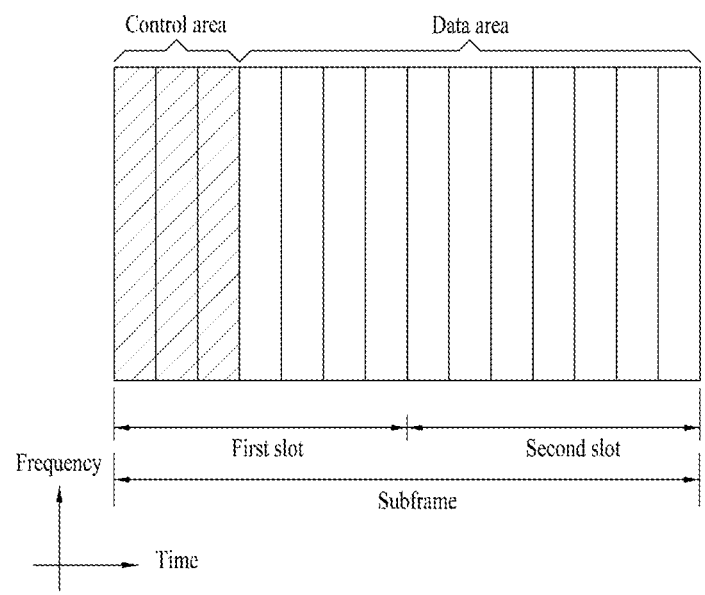
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a UE or a UE group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual UEs in a UE group, a Tx power control command, activation indication information of a VoIP (voice over IP) and the like. A plurality of PDCCHs may be transmitted in a control region. A UE can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A BS determines the PDCCH format in accordance with DCI to be transmitted to a UE and attaches CRC (cyclic redundancy check) to control information. The CRC is masked with an identifier (e.g., RNTI (radio network temporary identifier)) in accordance with an owner or a purpose of use. For instance, if a PDCCH is provided for a specific UE, CRC may be masked with an identifier (e.g., C-RNTI (cell-RNTI)) of the corresponding UE. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
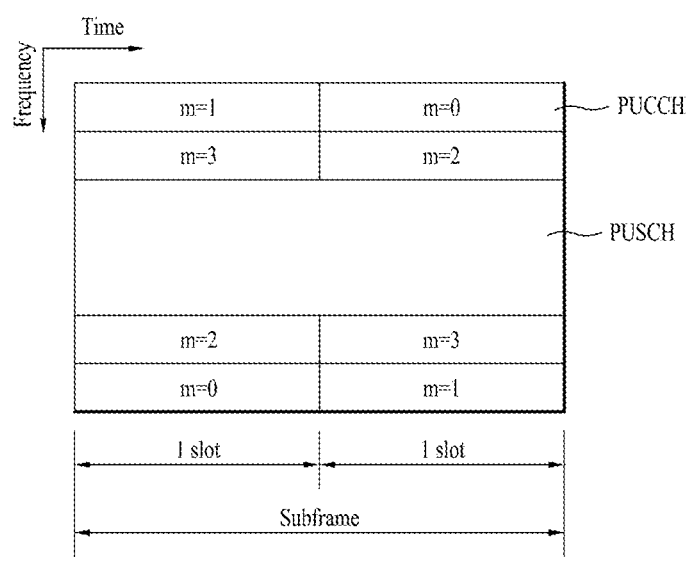
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.
  SR (scheduling request): This is information used to request a UL-SCH resource and is transmitted using an OOK (on-off keying) scheme.
  HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.
  CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a UE can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinbelow, a new radio access technology system will be described. As more communication devices have demanded higher communication capacity, there has been necessity of enhanced mobile broadband communication relative to legacy radio access technology (RAT). In addition, massive machine type communication (MTC) for providing various services at anytime and anywhere by connecting a plurality of devices and things to each other has also been required. Moreover, design of a communication system considering services/UEs sensitive to reliability and latency has been proposed.

As new RAT considering such enhanced mobile broadband communication, massive MTC, ultra-reliable and low latency communication (URLLC), and the like, a new RAT system has been proposed. In the present disclosure, the corresponding technology is referred to as new RAT or new radio (NR) for convenience of description.

The NR system to which the present disclosure is applicable supports various OFDM numerologies shown in the following table. In this case, the value of t and cyclic prefix information per carrier bandwidth part may be signaled for each of DL and UL. For example, the value of t and cyclic prefix information per DL carrier bandwidth part may be signaled though DL-BWP-mu and DL-MWP-cp corresponding to higher layer signaling. As another example, the value of t and cyclic prefix information per UL carrier bandwidth part may be signaled though UL-BWP-mu and UL-MWP-cp corresponding to higher layer signaling.

TABLE 3

| μ | $\Delta f = 2^\mu \cdot 15[kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

A frame structure in NR will now be described. For DL and UL transmission, a frame having a length of 10 ms is configured. The frame may include 10 subframes, each having a length of 1 ms. In this case, the number of consecutive OFDM symbols in each subframe is $N_{symb}^{subframe,\mu} = N_{symb}^{slot} N_{slot}^{subframe,\mu}$.

Each subframe may be composed of two half-frames with the same size. In this case, the two half-frames are composed of subframes 0 to 4 and subframes 5 to 9, respectively.

Regarding the subcarrier spacing a, slots may be numbered within one subframe in ascending order like $n_s^\mu \in \{0, \ldots, N_{slot}^{subframe,\mu}-1\}$ and may also be numbered within one frame in ascending order like $n_{s,f}^\mu \in \{0, \ldots, N_{slot}^{subframe,\mu}-1\}$. In this case, the number of consecutive OFDM symbols ($N_{symb}^{slot}$) in one slot may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 below shows the number of OFDM symbols in each slot/frame/subframe in the case of a normal cyclic prefix, and Table 5 below shows the number of OFDM symbols in each slot/frame/subframe in the case of an extended cyclic prefix.

TABLE 4

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

In the NR system to which the present disclosure is applicable, a self-contained slot structure may be applied based on the above-described slot structure.

Figure 8:
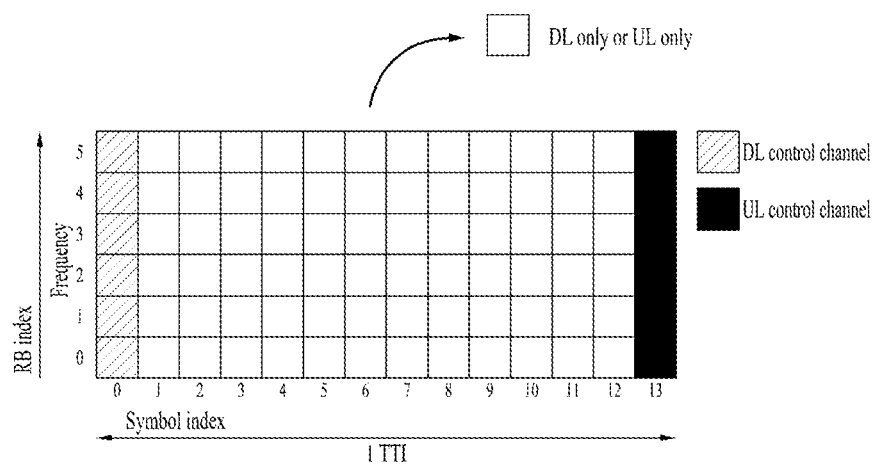
FIG. 8 is a reference diagram for explaining a self-contained slot structure in an NR system.

FIG. 8 is a reference diagram for explaining a self-contained slot structure applicable to the present disclosure.

In FIG. 8, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, the eNB and UE may sequentially perform DL transmission and UL transmission in one slot. That is, the eNB and UE may transmit and receive DL data and UL ACK/NACK in response to the DL data in one slot. Consequently, due to such a structure, it is possible to reduce a time required until data retransmission in the case in which a data transmission error occurs, thereby minimizing the latency of final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although the case in which the self-contained slot structure includes both the DL and UL control regions has been described above, these control regions may be selectively included in the self-contained slot structure. In other words, the self-contained slot structure according to the present disclosure may include either the DL control region or the UL control region as well as both the DL and UL control regions as illustrated in FIG. 8.

For example, the slot may have various slot formats. In this case, OFDM symbols in each slot may be divided into DL symbols (denoted by 'D'), flexible symbols (denoted by 'X'), and UL symbols (denoted by 'U').

Thus, the UE may assume that DL transmission occurs only in symbols denoted by 'D' and 'X' in the DL slot. Similarly, the UE may assume that UL transmission occurs only in symbols denoted by 'U' and 'X' in the UL slot.

Hereinafter, analog beamforming will be described.

In a millimeter wave (mmW) system, since a wavelength is short, a plurality of antenna elements may be installed in the same area. That is, considering that the wavelength at 30 GHz band is 1 cm, a total of 100 antenna elements may be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element may include a transceiver unit (TXRU) to enable adjustment of transmit power and phase per antenna element. By doing so, each antenna element may perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is difficult because only one beam direction is generated over the full band.

To solve this problem, as an intermediate form of digital BF and analog BF, hybrid BF with B TXRUs that are fewer than Q antenna elements may be considered. In the case of the hybrid BF, the number of beam directions that may be transmitted at the same time is limited to B or less, which depends on how B TXRUs and Q antenna elements are connected.

Figure 9:
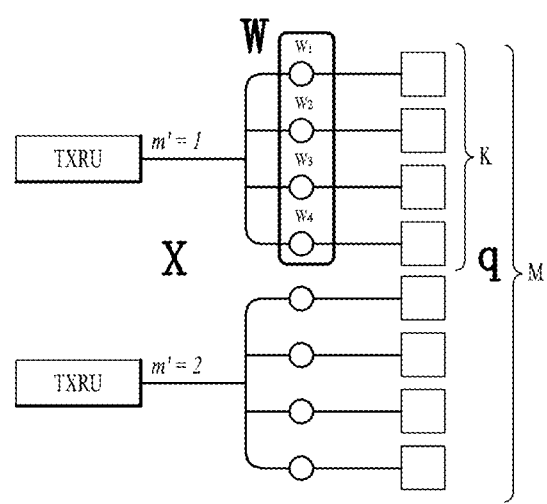
FIGS. 9 and 10 are reference diagrams for explaining methods for connecting TXRUs to antenna elements.
Figure 10:
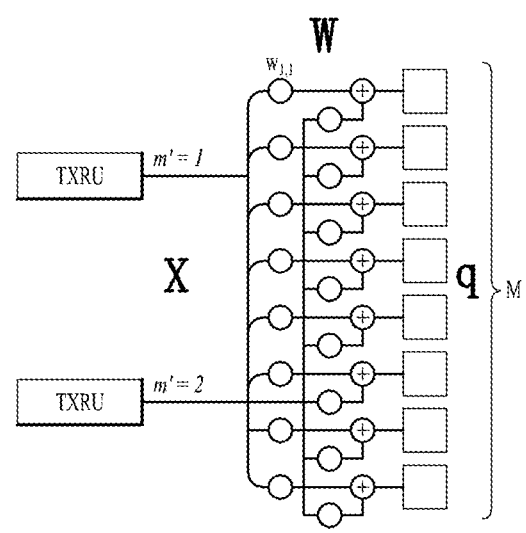

FIGS. 9 and 10 are diagrams illustrating representative methods for connecting TXRUs to antenna elements. Here, the TXRU virtualization model represents the relationship between TXRU output signals and antenna element output signals.

FIG. 9 illustrates a method for connecting TXRUs to sub-arrays. In FIG. 9, an antenna element is connected to only one TXRU.

Meanwhile, FIG. 10 illustrates a method for connecting all TXRUs to all antenna elements. In FIG. 10, an antenna element is connected to all TXRUs. In this case, separate addition units are required to connect an antenna element to all TXRUs as illustrated in FIG. 8.

In FIGS. 9 and 10, W indicates a phase vector weighted by an analog phase shifter. That is, W is a main parameter determining the direction of analog beamforming. In this case, the mapping relationship between CSI-RS antenna ports and TXRUs may be 1:1 or 1-to-many.

The configuration illustrated in FIG. 9 has a disadvantage in that it is difficult to achieve BF focusing but has an advantage in that all antennas may be configured at low cost.

The configuration illustrated in FIG. 10 is advantageous in that beamforming focusing may be easily achieved. However, since all antenna elements are connected to the TXRU, the configuration has a disadvantage of increase in cost.

When a plurality of antennas is used in the NR system to which the present disclosure is applicable, the hybrid BF method obtained by combining digital BF and analog BF may be applied. In this case, analog (or radio frequency (RF)) BF means an operation in which precoding (or combining) is performed at an RF end. In the case of hybrid BF, precoding (or combining) is performed at each of a baseband end and the RF end. Thus, hybrid BF is advantageous in that it guarantees performance similar to digital BF while reducing the number of RF chains and digital-to-analog (D/A) (or analog-to-digital (A/D)) converters.

For convenience of description, the hybrid BF structure may be represented by N TXRUs and M physical antennas. In this case, digital BF for L data layers to be transmitted by a transmitting end may be represented by an N*L (N by L) matrix. Thereafter, N converted digital signals are converted into analog signals by the TXRUs, and then analog BF, which may be represented by an M*N (M by N) matrix, is applied to the converted signals.

Figure 11:
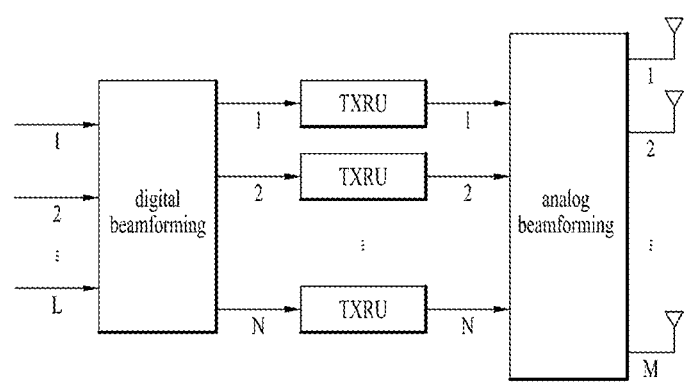
FIG. 11 is a reference diagram for explaining hybrid beamforming.

FIG. 11 is a schematic diagram illustrating a hybrid BF structure from the perspective of TXRUs and physical antennas. In FIG. 11, the number of digital beams is L and the number of analog beams is N.

Additionally, a method for providing efficient BF to UEs located in a specific area by designing an eNB capable of changing analog BF on a symbol basis has been considered in the NR system. Further, when N TXRUs and M RF antennas are defined as one antenna panel, a method of introducing a plurality of antenna panels in which independent hybrid BF may be applied has also been considered in the NR system according to the present disclosure.

When the eNB uses a plurality of analog beams as described above, each UE has a different analog beam suitable for signal reception. Thus, a beam sweeping operation in which the eNB transmits signals (at least synchronization signals, system information, paging, etc.) by applying a different analog beam to each symbol in a specific subframe in order to allow all UEs to have reception opportunities has been considered in the NR system to which the present disclosure is applicable.

Hereinafter, in the present disclosure, a description will be given of a method of using a short transmission time interval (TTI) on LTE DL/UL in a dual connectivity (DC) situation in which a UE is connected to an NR BS and an LTE BS simultaneously. The following description mainly focuses on the EN-DC situation, namely, a combination of LTE Pcell and NR Scell. However, this is merely for convenience of description and the present disclosure should not be construed as being limited thereto.

In 3GPP Rel. 15, dual connectivity by which a UE is connected to an NR BS and an LTE BS simultaneously is under discussion. In a specific band combination, when NR uplink (NR UL) and LTE uplink (LTE UL) are transmitted at the same time, intermodulation distortion (IMD) interference occurs on the LTE DL. In order to support the transmission, technology for single transmission (Tx) has been discussed, and a scheme for time division multiplexing (TDM) of LTE UL and NR UL is under discussion.

In order to perform TDM of LTE UL and NR UL, the LTE BS UE-specifically uses a portion of LTE UL resources. When only some UL subframes are used for LTE on LTE UL, to which frequency division duplex (FDD) is applied, only some DL subframes may need to be used to indicate UL subframes for scheduling/HARQ timing. Therefore, in order to use HARQ timing of cross carrier scheduling of TDD-FDD CA of LTE TDD PCell and FDD SCell to indicate UL subframes in more DL subframes, an LTE DL reference UL/DL TDD configuration may be configured for a dual connectivity UE.

Using a short TTI (sTTI) for LTE DL/UL in a dual connectivity situation may make time division multiplexing (TDM) of LTE UL and NR UL more flexible. Considering that NR UL allows transmission to be performed with various transmission time interval (TTI) lengths in TDD, LTE UL may also allow TDM of an LTE sTTI and NR sTTI in one LTE subframe, thereby producing more different transmission timings.

Further, when an sTTI is used in LTE, scheduling/HARQ timing needs to be considered. This may use both LTE FDD and LTE TDD-FDD CA. When LTE carrier aggregation (LTE CA) is used as described above, UL may be indicated in any DL subframes. However, when the sTTI is used, scheduling/HARQ timing needs to be changed to indicate all ULs in all DL subframes.

In particular, in Latency Reduced (LR), which is an agenda of sTTI currently being handled in LTE, a short-TTI PDCCH or short-TTI PDSCHs associated with short TTI ULs in one UL subframe that is indicated for scheduled PUSCH or HARQ Ack/Nack transmission is mapped to a time earlier than one DL subframe by a delta short TTI (ΔsTTI) number. The short-TTI PDCCH or short-TTI PDSCHs within the length of one DL subframe and short TTIs within the length of one UL subframe associated therewith for scheduled PUSCH or HARQ Ack/Nack transmission are mapped by determining the relative positions thereof on the assumption that there is only one subframe. A rule for determining the relative positions (e.g., k=n+4) may be preconfigured or indicated through higher layer signaling (e.g., RRC signaling). Hereinafter, in the present disclosure, a mapping method determined between the length of one DL subframe and the length of one UL subframe associated therewith will be described.

In the present disclosure, in using a short TTI in LTE,
use of only some ULs in FDD and
scheduling/HARQ timing may be supported in the follow manner.

When DL-reference TDD UL/DL configuration is established for UL, a short-TTI PDCCH or a short-TTI PDSCH may be mapped a ΔsTTI number later, and then a UL subframe to be transmitted may be found based on HARQ timing of TDD-FDD CA for TDD PCell-FDD SCell used in LTE. Then, sTTI DL and sTTI UL may be mapped to the found subframe.

This method is effective when some UL resources to be used in LTE FDD UL are in subframe units. However, in order to flexibly perform TDM of LTE UL and NR UL dual-connected therewith, UL resources may be used as LTE resources on a per short-TTI basis.

Therefore, in the present disclosure, in using the short TTI in LTE,
use of only some ULs in FDD, and
scheduling/HARQ timing may be additionally supported in the follow manner.

When DL-reference TDD UL/DL configuration is established for UL, and there is one short-TTI in the configured UL, a UL subframe for transmission may be found based on the HARQ timing of the TDD-FDD CA for the TDD PCell-FDD SCell which is used in LTE, and then scheduled PUSCH or HARQ Ack/Nack may be transmitted in the short-TTI present therein.

Here, the position of the short TTI in the UL subframe may be indicated by higher layer signaling (e.g., RRC signaling) or on a media access control control element (MAC CE) or a control channel, or may be pre-specified.

However, when there is only one sTTI in the UL subframe configured in the DL-reference TDD UL/DL configuration, only short TTIs in some subframes may be used for UL, which is disadvantageous.

Therefore, in the present disclosure, in using a short TTI in LTE,
use of only some ULs in FDD and
scheduling/HARQ timing may be supported in the following manner.

When one short TTI is present within all UL subframes, a UL subframe for transmission may be found based on the HARQ timing of FDD used in LTE, and then the scheduled PUSCH or HARQ Ack/Nack may be transmitted in the short-TTI present therein.

Here, the position of the short TTI in the UL subframe may be indicated by higher layer signaling (e.g., RRC signaling) or on a MAC CE or control channel, or may be pre-specified.

Further, when TDM of two UL carriers or different UL and DL carriers is performed to support single Tx in dual connectivity, allowing the short-TTI unit may ensure efficient TDM.

Figure 12A:
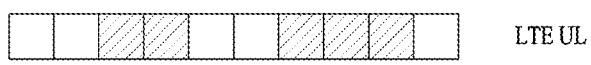
FIGS. 12A and 12B are reference diagrams for describing TDM types according to an embodiment of the present disclosure.
Figure 12A:
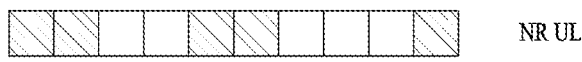
Figure 12B:
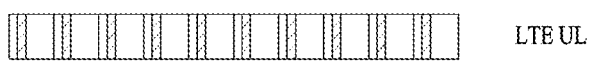
Figure 12B:

FIGS. 12A and 12B are reference diagrams for describing efficient TDM using a short TTI. FIGS. 12A and 12B show types of TDM of LTE UL and NR UL in dual connectivity (DC) for each TDM unit. FIG. 12A shows UL timing of LTE UL and NR UL when TDM is performed on a subframe basis. FIG. 12B shows that UL timings may be spread over time in both LTE and NR when TDM is performed on a short TTI basis.

For TDM on the short TTI basis described above, the following units may be considered for backhaul signaling between BSs corresponding to each UL in performing TDM on UL:
⅔ short TTI in LTE (2 symbols/3 symbols);
Slot short TTI in LTE (7 symbols); and
Subframe in LTE.

However, when a TDM pattern is exchanged between BSs in combinations of all these units, the number of combinations may become excessively large, resulting in high complexity. In this regard, the following rules are proposed in the present disclosure.

Rule 1: A maximum of one short TTI may be allowed in one subframe. This refers to, for example, a pattern in which only one short TTI is present in each subframe. With this rule, latency may be reduced because at least one UL is present in one subframe.

Rule 2: In the case where a short TTI is present in one subframe and is positioned at the foremost or rearmost part of the subframe, the control information of NR may be protected if an LTE short TTI is present in the subframe and is positioned at the rearmost part of the subframe. If the LTE short TTI is positioned at the foremost part of the subframe, the NR frame may be shifted to protect the control information of NR.

Figure 13:
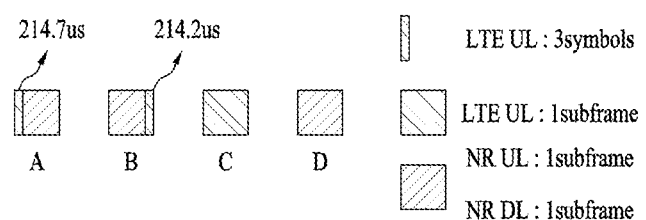
FIGS. 13 and 14 are reference diagrams for describing TDM patterns according to an embodiment of the present disclosure.

FIG. 13 is a reference diagram illustrating an exemplary case where TDM patterns A to D having a periodicity of 40 ms and subframe granularity of 1 ms and configured considering single UL Tx and UL/DL TDM are applied as a 2-bit bitmap. The patterns are as follows:
Pattern A: 3 symbols at the foreside of subframe for LTE;
Pattern B: 3 symbols at the backside of subframe for LTE;
Pattern C: 1 subframe for LTE;
Pattern D: 0 subframe for LTE.

In FIG. 13, when the TDM pattern is pattern A or pattern B with the periodicity of 40 ms, a scheduling/HARQ timing related issue that may be raised due to coupling between the LTE FDD LR scheduling/HARQ timing and the existing system may be alleviated.

Figure 14:
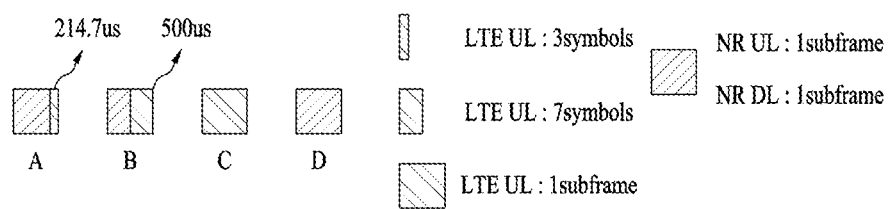

FIG. 14 is a reference diagram illustrating another exemplary case where TDM patterns A to D having a periodicity of 40 ms and subframe granularity of 1 ms and configured considering single UL Tx and UL/DL TDM are applied as a 2-bit bitmap. The patterns are as follows:
Pattern A: 3 symbols at the backside of subframe for LTE;
Pattern B: 7 symbols at the backside of subframe for LTE;
Pattern C: 1 subframe for LTE;
Pattern D: 0 subframe for LTE.

When the TDM pattern is pattern A or pattern B with the periodicity of 40 ms, a scheduling/HARQ timing related issue that may be raised due to coupling between the LTE FDD LR scheduling/HARQ timing and the existing system may be alleviated.

Further, in the current short-TTI (sTTI), only 1 slot DL TTI and 1 slot UL TTI are allowed in TDD, and Table 6 is applied for HARQ timing. Table 6 shows values of K for ACK/NACK transmission in slot n on the assumption that a grant is received in slot n−K.

Currently, in DC, both PUSCH scheduling/HARQ timing has been determined to conform to HARQ timing in transmitting, in the PCell, ACK/NACK for DL assignment of the SCell in TDD PCell-FDD SCell CA. Similarly, sTTI may use Table 7 for both scheduling/HARQ timing.

TABLE 6

| TDD UL/DL Conf. | slot number n | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0 | | | | | 4 | 4 | 4 | 4 | | | | | | | 4 | 4 | 4 | 4 | | |
| 1 | | | | | 6, 5 | 5, 4 | 4 | 4 | | | | | | | 6, 5 | 5, 4 | 4 | 4 | | |
| 2 | | | | | 8, 7, 12, 11 | 7, 6, 5, 4 | | | | | | | | | 8, 7, 12, 11 | 7, 6, 5, 4 | | | | |
| 3 | | | | | 14, 13, 12 | 12, 11, 10 | 10, 9 | 9, 8 | 8, 7 | | | 7, 6 | | | | | | | | |
| 4 | | | | | 16, 15, 14, 13 | 13, 12, 11, 10 | 10, 9, 8, 7 | 7, 6, 5, 4 | | | | | | | | | | | | |
| 5 | | | | | 18, 17, 16, 15, 14, 13, 12, 22, 21 | 12, 11, 10, 9, 8, 7, 6, 5, 4 | | | | | | | | | | | | | | |
| 6 | | | | | 6 | 6 | 6 | 6 | 6 | | | 6 | | | 4 | 4 | 4 | 4 | | |

According to Table 6, when an sTTI is configured in dual connectivity (DC), the TDD configuration may be received and only UL corresponding thereto is available in LTE. Accordingly, when Table 6 described above is used, LTE DL may not be used efficiently. In particular, DL assignment may not be allowed in a DL subframe at a time corresponding to the UL subframe of the TDD configuration.

Therefore, the table may be modified to Table 7 to allow DL assignment in the UL subframe.

Table 7 shows, based on the timing of Table 6, which is HARQ timing in the case where DL assignment is received in a DL subframe and a special subframe in the TDD configuration, HARQ timing in the case where DL assignment is received in a DL subframe at the same time corresponding to a UL subframe in the TDD configuration. Table 7 is designed to prevent excessive concentration of many ACK/NACK transmissions in some UL slots while satisfying the condition of K>=4 when DL assignment is received at a position corresponding to the UL subframe.

When it is assumed that a new PUSCH scheduling timing is generated, the PUSCH scheduling timing in the current sTTI is given as shown in Table 8. Table 8 shows values of K given when PUSCH is transmitted in slot n+K in the case where a UL grant is received in slot n. Table 8 basically shows values of K designed in the case where UL grants are received in a DL subframe and a special subframe in the TDD configuration. Specifically, when the number of DL subframes is greater than the number of UL subframes, UL grants are limited to be received within the number of UL subframes. Since DL assignments will be more than UL assignments and it is difficult to transmit many PUSCHs on the limited UL resources, monitoring complexity of the UE may be lowered by limiting the UL grant occasions. PUSCH scheduling in DC may also use Table 8 for the same reason.

TABLE 7

| TDD UL/DL Conf. | slot number n | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0 | | | | | 8, 4 | 8, 4 | 8, 4 | 8, 4 | 4 | 4 | | | | | 8, 4 | 8, 4 | 8, 4 | 8, 4 | 4 | 4 |
| 1 | | | | | 10, 6, 5 | 10, 5, 4 | 10, 4 | 10, 4 | | | | | | | 10, 6, 5 | 10, 5, 4 | 10, 4 | 10, 4 | | |
| 2 | | | | | 10, 8, 7, 12, 11 | 10, 7, 6, 5, 4 | | | | | | | | | 10, 8, 7, 12, 11 | 10, 7, 6, 5, 4 | | | | |
| 3 | | | | | 18, 14, 13, 12 | 18, 12, 11, 10 | 18, 10, 9 | 18, 9, 8 | 8, 7, 4 | 7, 6, 4 | | | | | | | | | | |
| 4 | | | | | 17, 16, 15, 14, 13 | 17, 13, 12, 11, 10 | 17, 10, 9, 8, 7 | 17, 7, 6, 5, 4 | | | | | | | | | | | | |
| 5 | | | | | 19, 18, 17, 16, 15, 14, 13, 12, 22, 21 | 21, 12, 11, 10, 9, 8, 7, 6, 5, 4 | | | | | | | | | | | | | | |
| 6 | | | | | 10, 6 | 10, 6 | 10, 6 | 10, 6 | 6, 4 | 6, 4 | | | | | 5, 4 | 6, 4 | 8, 4 | 8, 4 | | |

TABLE 8

| TDD UL/DL Configuration | \ | \ | \ | \ | \ | \ | \ | \ | slot number n | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0 | 4 | 4 | 4, 5 | 5, 6 | | | | | | | 4 | 4 | 4, 5 | 5, 6 | | | | | | |
| 1 | 4 | 4 | 4 | 4 | | | | | | | 4 | 4 | 4 | 4 | | | | | | |
| 2 | 4 | 4 | | | | | | | | | 4 | 4 | | | | | | | | |
| 3 | 6 | 6 | 6 | 6 | | | | | | | | | | | | | | | 6 | 6 |
| 4 | 4 | 4 | 4 | 4 | | | | | | | | | | | | | | | | |
| 5 | 4 | 4 | | | | | | | | | | | | | | | | | | |
| 6 | 6 | 6 | 6 | 6 | | | | | | | 4 | 4 | 4 | 4 | | | | | 6 | 6 |

Alternatively, for the same reason, the UL grant occasions may be limited to the number of UL subframes, but may be designed as shown in Table 9 to lower latency. Only UL timing is limited to the TDD configuration for LTE FDD carriers, and DL timing is available at any time. Accordingly, when Table 9 is used in DC, a UL grant may always be allowed to be transmitted in a DL slot before 4 slots in a UL subframe. Since Table 8 allows the UL grant to be transmitted only in the DL subframe and the special subframe, Table 9 is not applicable.

TABLE 9

| TDD UL/DL Configuration | \ | \ | \ | \ | \ | \ | \ | \ | slot number n | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| 0 | 4 | 4 | 4 | 4 | 4 | 4 | | | | | 4 | 4 | 4 | 4 | 4 | 4 | | | | |
| 1 | 4 | 4 | 4 | 4 | | | | | | | 4 | 4 | 4 | 4 | | | | | | |
| 2 | 4 | 4 | | | | | | | | | 4 | 4 | | | | | | | | |
| 3 | 4 | 4 | 4 | 4 | 4 | 4 | | | | | | | | | | | | | | |
| 4 | 4 | 4 | 4 | 4 | | | | | | | | | | | | | | | | |
| 5 | 4 | 4 | | | | | | | | | | | | | | | | | | |
| 6 | 4 | 4 | 4 | 4 | 4 | 4 | | | | | 4 | 4 | 4 | 4 | | | | | | |

Figure 15:
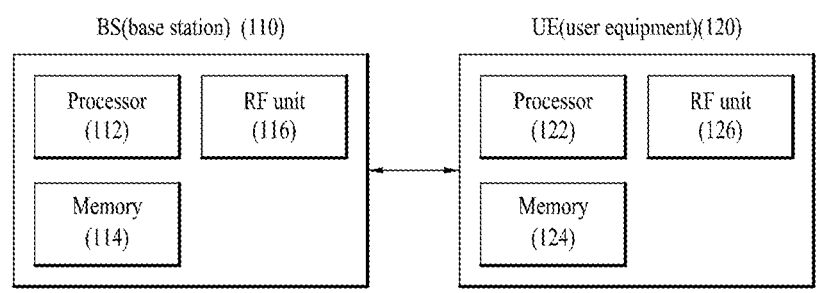
FIG. 15 illustrates a base station (BS) and a user equipment (UE) applicable to an embodiment of the present disclosure.

FIG. 15 illustrates a base station (BS) and a user equipment (UE) applicable to an embodiment of the present disclosure.

When a relay node is included in a wireless communication system, backhaul link communication is performed between the BS and the relay node, and access link communication is performed between the relay node and the UE. Therefore, the BS or UE shown in the drawing may be replaced with the relay node in some cases.

Referring to FIG. 15, a wireless communication system includes a base station (BS) 110 and a user equipment (UE) 120. The BS 110 includes a processor 112, a memory 114 and an RF (radio frequency) unit 116. The processor 112 can be configured to implement the procedures and/or methods proposed in the present disclosure. The memory 114 is connected to the processor 112 and stores various kinds of information related to operations of the processor 112. The RF unit 116 is connected to the processor 112 and transmits and/or receives radio or wireless signals. The UE 120 includes a processor 122, a memory 124 and an RF unit 126. The processor 122 can be configured to implement the procedures and/or methods proposed in the present disclosure. The memory 124 is connected to the processor 122 and stores various kinds of information related to operations of the processor 122. The RF unit 126 is connected to the processor 122 and transmits and/or receives radio or wireless signals. The BS 110 and/or the UE 120 can have a single antenna or multiple antennas.

The above-described embodiments may correspond to combinations of elements and features of the present disclosure in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present disclosure by combining elements and/or features together in part. A sequence of operations explained for each embodiment of the present disclosure may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a BS can be performed by an upper node of the BS in some cases. In particular, in a network constructed with a plurality of network nodes including a BS, it is apparent that various operations performed for communication with a UE can be performed by a BS or other network nodes except the BS. In this case, 'BS' can be replaced by such a terminology as a fixed station, a Node B, an eNodeB (eNB), an access point and the like.

The embodiments of the present disclosure may be implemented using various means. For instance, the embodiments of the present disclosure may be implemented using hardware, firmware, software and/or any combinations thereof. In case of the implementation by hardware, one embodiment of the present disclosure may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present disclosure may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present disclosure can be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

INDUSTRIAL APPLICABILITY

In the wireless communication system as described above, the method of transmitting and receiving an LTE-based signal and an NR-based signal and an apparatus therefor are applicable to various wireless communication systems.

wherein, based on there being one short-transmission time interval (sTTI) in the uplink subframe:

the uplink subframe is determined based on Hybrid Automatic Repeat Request (HARD) timing for carrier aggregation of an LTE-based TDD Primary Cell (Pcell) and an FDD Secondary Cell (Scell)

an uplink signal is transmitted in the first transmission time unit, which is configured for the first RAT which is FDD-based LTE, in the uplink subframe, the first transmission time unit is the one sTTI in the uplink subframe wherein the HARQ timing related to the first transmission time unit is determined according to a preset value of K, where K is a natural number, and wherein the preset value of K depends on (i) the downlink reference TDD UL/DL configuration and (ii) a time unit index n of the first transmission time unit in which the uplink signal is transmitted, according to:

| TDD UL/DL Conf. | \multicolumn{20}{c}{time unit index n} |
|---|

| TDD UL/DL Conf. | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 8, 4 | 8, 4 | 8, 4 | 8, 4 | 4 | 4 | | | | | 8, 4 | 8, 4 | 8, 4 | 8, 4 | 4 | 4 |
| 1 | | | | | 10, 6, 5 | 10, 5, 4 | 10, 4 | 10, 4 | | | | | | | 10, 6, 5 | 10, 5, 4 | 10, 4 | 10, 4 | | |
| 2 | | | | | 10, 8, 7, 12, 11 | 10, 7, 6, 5, 4 | | | | | | | | | 10, 8, 7, 12, 11 | 10, 7, 6, 5, 4 | | | | |
| 3 | | | | | 18, 14, 13, 12 | 18, 12, 11, 10 | 18, 10, 9 | 18, 9, 8 | 8, 7, 4 | 7, 6, 4 | | | | | | | | | | |
| 4 | | | | | 17, 16, 15, 14, 13 | 17, 13, 12, 11, 10 | 17, 10, 9, 8, 7 | 17, 7, 6, 5, 4 | | | | | | | | | | | | |
| 5 | | | | | 19, 18, 17, 16, 15, 14, 13, 12, 22, 21 | 21, 12, 11, 10, 9, 8, 7, 6, 5, 4 | | | | | | | | | | | | | | |
| 6 | | | | | 10, 6 | 10, 6 | 10, 6 | 10, 6 | 6, 4 | 6, 4 | | | | | 6, 4 | 6, 4 | 8, 4 | 8, 4 | | |

The invention claimed is:

1. A method for transmitting and receiving a signal by a terminal dual-connected to a first Radio Access Technology (RAT) and a second RAT in a wireless communication system, the method comprising:
receiving a downlink reference Time Domain Duplex (TDD) uplink-downlink (UL/DL) configuration based on the first RAT; and
performing time division multiplexing (TDM) of configuring a first transmission time unit for the first RAT and configuring a second transmission time unit for the second RAT in an uplink subframe,
wherein the first RAT is Frequency Domain Duplex (FDD)-based Long Term Evolution (LTE),
wherein the second RAT is New Radio Access Technology (NR),
wherein based on that the uplink subframe based on the downlink reference TDD UL/DL configuration is related to the first transmission time unit having a predetermined length, the second transmission time unit except the first transmission time unit is configured for the second RAT in the uplink subframe, wherein (n−K) is a time unit index of receiving an uplink grant that schedules transmission of the uplink signal.

2. The method of claim 1, wherein relative positions of uplink signals having the first transmission time unit are configured through higher layer signaling, and
wherein the uplink signals are related to a downlink signal having the first transmission time unit.

3. The method of claim 1, wherein the first transmission time unit of the uplink subframe is configured through one of higher layer signaling, a Media Access Control Element (MAC CE), or a control channel.

4. A terminal for transmitting and receiving a signal while being dual-connected to a first Radio Access Technology (RAT) and a second RAT in a wireless communication system, the terminal comprising:
a radio frequency unit; and
a processor,
wherein the processor is configured to:
receive a downlink reference Time Domain Duplex (TDD) uplink-downlink (UL/DL) configuration based on the first RAT; and configure a first transmission time unit for the first RAT and configure a second transmission time unit for the second RAT in an uplink subframe, wherein the first RAT is a Frequency Domain Duplex (FDD)-based Long Term Evolution (LTE) band, wherein the second RAT is New Radio Access Technology (NR), based on that the uplink subframe based on the downlink reference TDD UL/DL configuration is related to a first transmission time unit having a predetermined length, the second transmission time unit is configured for the second RAT in the uplink subframe except the first transmission time unit, wherein, based on there being one short-transmission time interval (sTTI) in the uplink subframe:

the uplink subframe is determined based on Hybrid Automatic Repeat Request (HARQ) timing for carrier aggregation of an LTE-based TDD Primary Cell (Pcell) and an FDD Secondary Cell (Scell)

an uplink signal is transmitted in the first transmission time unit, which is configured for the first RAT which is FDD-based LTE, in the uplink subframe, the first transmission time unit is the one sTTI in the uplink subframe, wherein the HARQ timing related to the first transmission time unit is determined according to a preset value of K, where K is a natural number, and wherein the preset value of K depends on (i) the downlink reference TDD UL/DL configuration and (ii) a time unit index n of the first transmission time unit in which the uplink signal is transmitted, according to:

| TDD UL/DL Conf. | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | | | | | 8, 4 | 8, 4 | 8, 4 | 8, 4 | 4 | 4 | | | | | 8, 4 | 8, 4 | 8, 4 | 8, 4 | 4 | 4 |
| 1 | | | | | 10, 6, 5 | 10, 5, 4 | 10, 4 | 10, 4 | | | | | | | 10, 6, 5 | 10, 5, 4 | 10, 4 | 10, 4 | | |
| 2 | | | | | 10, 8, 7, 12, 11 | 10, 7, 6, 5, 4 | | | | | | | | | 10, 8, 7, 12, 11 | 10, 7, 6, 5, 4 | | | | |
| 3 | | | | | 18, 14, 13, 12 | 18, 12, 11, 10 | 18, 10, 9 | 18, 9, 8 | 8, 7, 4 | 7, 6, 4 | | | | | | | | | | |
| 4 | | | | | 17, 16, 15, 14, 13 | 17, 13, 12, 11, 10 | 17, 10, 9, 8, 7 | 17, 7, 6, 5, 4 | | | | | | | | | | | | |
| 5 | | | | | 19, 18, 17, 16, 15, 14, 13, 12, 22, 21 | 21, 12, 11, 10, 9, 8, 7, 6, 5, 4 | | | | | | | | | | | | | | |
| 6 | | | | | 10, 6 | 10, 6 | 10, 6 | 10, 6 | 6, 4 | 6, 4 | | | | | 6, 4 | 6, 4 | 8, 4 | 8, 4 | | | wherein (n−K) is a time unit index of receiving an uplink grant that schedules transmission of the uplink signal.

* * * * *